United States Patent
Hyser et al.

(10) Patent No.: US 9,092,250 B1
(45) Date of Patent: Jul. 28, 2015

(54) SELECTING ONE OF PLURAL LAYOUTS OF VIRTUAL MACHINES ON PHYSICAL MACHINES

(75) Inventors: Chris D. Hyser, Victor, NY (US); Bret A. McKee, Ft. Collins, CO (US); Robert D. Gardner, Ft. Collins, CO (US); Daniel J. Magenheimer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2770 days.

(21) Appl. No.: 11/588,691

(22) Filed: Oct. 27, 2006

(51) Int. Cl.
*G06F 9/46* (2006.01)
*G06F 9/455* (2006.01)

(52) U.S. Cl.
CPC .... *G06F 9/45558* (2013.01); *G06F 2009/4557* (2013.01)

(58) Field of Classification Search
CPC .............................................. G06F 2009/4557
USPC ...................................................... 718/1, 104
See application file for complete search history.

(56) References Cited

U.S. PATENT DOCUMENTS

| | | | | |
|---|---|---|---|---|
| 5,745,735 | A * | 4/1998 | Cohn et al. ........................ | 703/6 |
| 5,802,062 | A | 9/1998 | Gehani | |
| 6,321,337 | B1 | 11/2001 | Reshef | |
| 6,421,739 | B1 | 7/2002 | Holiday | |
| 6,732,139 | B1 | 5/2004 | Dillenberger | |
| 6,901,522 | B2 * | 5/2005 | Buch ............................. | 713/320 |
| 6,934,952 | B2 | 8/2005 | Sarkar | |
| 6,944,699 | B1 | 9/2005 | Bugnion et al. | |
| 6,970,902 | B1 | 11/2005 | Moon | |
| 6,985,951 | B2 | 1/2006 | Kubala | |
| 7,089,558 | B2 | 8/2006 | Baskey | |
| 7,127,625 | B2 * | 10/2006 | Farkas et al. ................... | 713/320 |
| 7,174,381 | B2 | 2/2007 | Gulko | |
| 7,203,944 | B1 | 4/2007 | van Rietschote | |
| 7,480,908 | B1 | 1/2009 | Tene | |
| 2002/0194389 | A1 | 12/2002 | Worley, Jr. et al. | |
| 2004/0010787 | A1 | 1/2004 | Traut et al. | |
| 2004/0117539 | A1 * | 6/2004 | Bennett et al. ................... | 711/6 |
| 2004/0186920 | A1 * | 9/2004 | Birdwell et al. ................... | 710/1 |
| 2004/0193476 | A1 | 9/2004 | Aerdts | |
| 2005/0039180 | A1 | 2/2005 | Fultheim | |
| 2005/0060590 | A1 * | 3/2005 | Bradley et al. ................. | 713/320 |
| 2005/0149940 | A1 | 7/2005 | Calinescu | |
| 2005/0166074 | A1 * | 7/2005 | Hack .............................. | 713/320 |
| 2005/0166075 | A1 * | 7/2005 | Hack .............................. | 713/320 |
| 2005/0246505 | A1 | 11/2005 | McKenney et al. | |
| 2005/0251802 | A1 | 11/2005 | Bozek | |
| 2005/0278722 | A1 | 12/2005 | Armstrong et al. | |

(Continued)

OTHER PUBLICATIONS

Megow et al., "Stochastic Online Scheduling on Parallel Machine," Springer-Verlag Berlin Heidelberg, pp. 167-180, 2005.*
Hou et al., "A Genetic Algorithm for Multiprocessor Scheduling," IEEE Transactions on Parallel and Distributed Systems, vol. 5, No. 2, Feb. 1994.*
YarKhan et al., "Experiments with Scheduling Using Simulated Annealing in a Grid Environment," Springer-Verlag Berlin Heidelberg, pp. 232-242, 2002.*

(Continued)

*Primary Examiner* — Meng An
*Assistant Examiner* — James J Lee
(74) *Attorney, Agent, or Firm* — Trop, Pruner & Hu, P.C.

(57) ABSTRACT

To provide an arrangement of virtual machines on physical machines, at least one controller compares indicators associated with plural different layouts of the virtual machines on the physical machines, wherein the indicators provide information regarding performances of corresponding layouts. The at least one controller selects one of the plural layouts based on the comparing.

9 Claims, 3 Drawing Sheets

(56) References Cited

U.S. PATENT DOCUMENTS

| | | |
|---|---|---|
| 2006/0023884 A1 | 2/2006 | McKee |
| 2006/0041733 A1 | 2/2006 | Hyser |
| 2006/0075067 A1 | 4/2006 | Blackmore |
| 2006/0136913 A1 | 6/2006 | Sameske |
| 2006/0149906 A1 | 7/2006 | Misra |
| 2006/0195715 A1 | 8/2006 | Herington |
| 2006/0200819 A1 | 9/2006 | Cherkasova et al. |
| 2006/0200820 A1 | 9/2006 | Cherkasova et al. |
| 2006/0200821 A1 | 9/2006 | Cherkasova et al. |
| 2006/0230407 A1* | 10/2006 | Rosu et al. ............. 718/105 |
| 2007/0043860 A1 | 2/2007 | Pabari |
| 2007/0067435 A1 | 3/2007 | Landis |
| 2007/0079307 A1 | 4/2007 | Dhawan |
| 2007/0083642 A1 | 4/2007 | Diedrich |
| 2007/0124474 A1 | 5/2007 | Margulis |
| 2007/0171921 A1 | 7/2007 | Wookey |
| 2007/0180280 A1 | 8/2007 | Bolan |
| 2007/0180448 A1 | 8/2007 | Low |
| 2007/0180450 A1 | 8/2007 | Croft |
| 2007/0186212 A1 | 8/2007 | Mazzaferri |
| 2007/0204266 A1* | 8/2007 | Beaty et al. ............. 718/1 |
| 2008/0082977 A1* | 4/2008 | Araujo et al. ............. 718/1 |

OTHER PUBLICATIONS

MVware Technology Network, "VMware VirtualCenter 1.2 Support Documentation," http://www.vmware.com/support/vc12/doc/c13migrationoyer.html, 16 pages (at least as early as Oct. 25, 2006).

Wikipedia definition of "Virtual machine," http://en.wikipedia.org/wiki/Virtual_machine, pp. 1-6 (at least as early as Sep. 6, 2006).

TheFreeDictionary definition of "Virtual Machine," http://computing-dictionary.thefreedictionary.com/virtual%20machine, pp. 1-3 (at least as early as Sep. 6, 2006).

Wikipedia definition for "Hypervisor," http://en.wikipedia.org./wiki/Hypervisor, pp. 1-2 (at least as early as Sep. 6, 2006).

U.S. Appl. No. 11/588,683, Non-Final Rejection dated Jun. 11, 2009, pp. 1-14 and attachments.

U.S. Appl. No. 11/588,683, Final Rejection dated Nov. 25, 2009, pp. 1-19 and attachments.

U.S. Appl. No. 11/588,683, Non-Final Rejection dated Jul. 13, 2010, pp. 1-20 and attachments.

U.S. Appl. No. 11/588,607, Non-Final Rejection dated Oct. 15, 2010, pp. 1-10 and attachments.

* cited by examiner

SELECTING ONE OF PLURAL LAYOUTS OF VIRTUAL MACHINES ON PHYSICAL MACHINES

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer For enhanced performance, virtual machines can be provided on multiple computers that are interconnected by a network. When deploying virtual machines on multiple computers, a human administrator typically has to decide at virtual machine creation time on which physical machine the virtual machine should be deployed. Conventionally, placement of virtual machines is typically performed manually by an administrator. Although some systems are able to provide some indication to the administrator that migrating a virtual machine from one computer to another computer would be desirable, the actual selection of which computer a virtual machine should be migrated to is performed manually by the human administrator. Such manual placement of virtual machines by a human administrator is typically a time-consuming process and often does not lead to optimal or even better placement of virtual machines.

SUMMARY

In general, according to an embodiment, automated placement of virtual machines on physical machines in a system is provided. Plural layouts corresponding to different placements are considered, where one of the plural layouts is selected based on predefined criteria according to a target policy.

Other or alternative features will become apparent from the following description, from the drawings, and from the claims.

BRIEF DESCRIPTION OF THE DRAWINGS

Some embodiments of the invention are described with respect to the following figures:

FIG. 4 is a flow diagram of a process performed by a cooling/power policy module, according to an embodiment.

DETAILED DESCRIPTION

Figure 1:
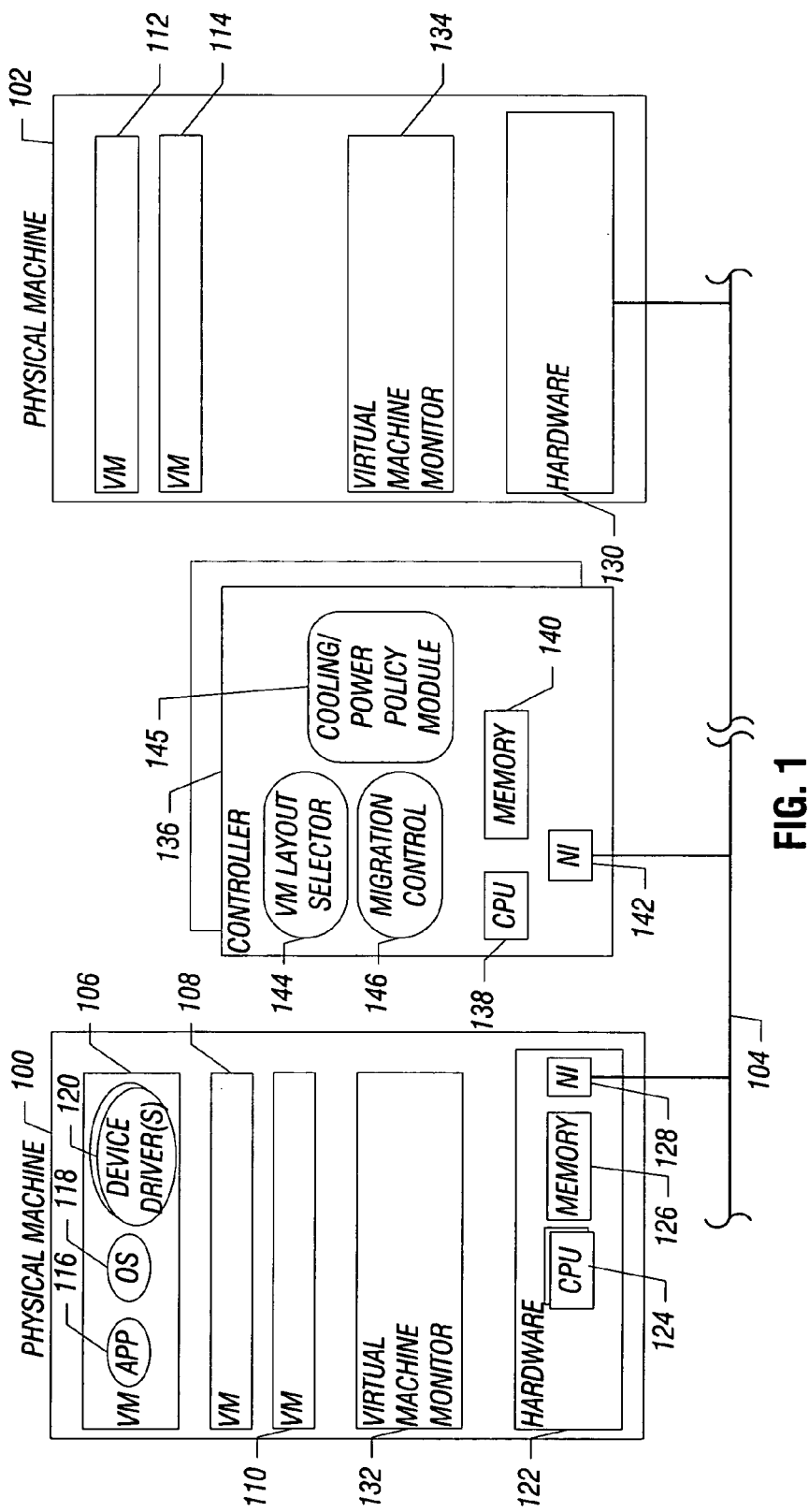
FIG. 1 is a block diagram of a system of physical machines on which virtual machines are deployed, where the system further includes a controller (or plural controllers) to perform automated selection of virtual machine layouts in accordance with some embodiments.

FIG. 1 illustrates a system that includes multiple physical machines 100, 102 that are interconnected by a network 104. Examples of the network 104 include a local area network (LAN), a wide area network (WAN), the Internet, or any other type of communications link. The physical machines can be located within one cabinet (or rack), or alternatively, the physical machines can be located in multiple cabinets (or racks). The network 104 can also include system buses or other fast interconnects. The system depicted in FIG. 1 can be any one of a data center, an application server farm, a storage server farm (or storage area network), a web server farm, a switch or router farm, and so forth. Although just two physical machines are depicted in FIG. 1, it is noted that more than two physical machines can be utilized in other implementations. Examples of the physical machines include computers (e.g., application servers, storage servers, web servers, etc.), communications modules (e.g., switches, routers, etc.), and other types of machines. "Physical machine" indicates that the machine is an actual machine made up of software and hardware. Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, three virtual machines 106, 108, and 110 are depicted in the physical machine 100, and two virtual machines 112, 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

A virtual machine refers to some partition or segment (made up of software and/or hardware) of the physical machine that is provided to virtualize or emulate a physical machine. From the perspective of a user, a virtual machine looks just like a physical machine. As depicted in FIG. 1, according to some embodiments, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine, these physical resources include the hardware 122 of the physical machine 100, which hardware 122 includes one or more central processing units (CPUs) 124, memory (volatile memory and/or persistent storage, such as disk-based storage) 126, a network interface 128, and other resources (such as a storage area network interface, not shown). Hardware 130 in the physical machine 102 contains similar components.

The physical machine 100 also includes a virtual machine monitor (VMM) 132, also called a hypervisor, which manages the sharing (by virtual machines 106, 108, 110) of the physical resources, including the hardware 122, of the physical machine 100. The VMM 132 virtualizes the physical resources, including the hardware 122, of the physical machine 100. Also, the VMM 132 intercepts requests for resources from operating systems in the respective virtual machines 106, 108, 110 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 122 of the physical machine 100. The interface provided by the VMM 132 to an operating system of a virtual machine is designed to emulate the interface provided by the actual hardware of the physical machine 100.

The physical machine 102 similarly includes a VMM 134 that provides the interface between the virtual machines 112, 114 and the physical resources, including hardware 130, of the physical machine 102.

In accordance with some embodiments, one or more placement controllers 136 are provided on the network 104 to provide automated management of the placement of virtual machines in corresponding physical machines 100, 102 (and any other physical machines in the system depicted in FIG. 1). In the ensuing discussion, reference is made to just one placement controller 136; however, note that the tasks of the one placement controller 136 can be performed by multiple placement controllers.

The placement controller 136 is able to determine an efficient placement of the virtual machines on corresponding physical machines based on predefined criteria (according to a target policy set by an enterprise, a user, an administrator, etc.). The predefined criteria according to the policy can include a target quality-of-service level to be provided, loading criteria (which specify some target loading level on a physical resource or machine), balancing criteria (which specify that load on physical machines should balanced when possible), cooling criteria (which specify temperatures in physical machines that should not be exceeded), power criteria (which specify that power consumption should be reduced where possible), and other criteria.

The placement controller 136 is able to determine whether the current state of the overall system (which includes the multiple physical machines) conforms to the policy. If the placement controller 136 determines that the state of the system does not conform to the policy, then the placement controller 136 can perform a re-evaluation to determine a different placement of virtual machines on physical machines to increase conformance to the policy.

If a different placement is determined by the placement controller 136 to be desirable, the placement controller 136 is able to perform migration of virtual machines from one physical machine to another physical machine. After placement of the virtual machines has been changed (by migration), the placement controller 136 can subsequently determine whether further migration should be performed. Note that workloads at the physical machines are continually changing. The placement controller 136 repeatedly checks (in a loop) whether the state of the system conforms to policy. In effect, the placement controller 136 provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

The automated placement (initial and dynamic) of virtual machines on physical machines provided by the controller 136 according to some embodiments allows the system to meet customer quality-of-service (QoS) goals and the system's cost-of-service (CoS) goals on a given resource (made up of the physical machines in the system).

Computing an optimal solution to the problem of placement of virtual machines on physical machines in the system is NP-hard (non-deterministic polynomial-time hard). Moreover, a further complication with respect to the virtual machine placement problem is that resource constraints are not fixed, such as due to continual changes that are experienced by physical machines (e.g., workloads of the physical machines constantly changing due to applications being launched or applications being closed, traffic conditions changing, etc.). Consequently, even though an optimal solution for the placement problem can be identified for a particular instant in time, this solution may no longer be optimal at some later instant in time. By providing a feedback-driven mechanism in accordance with some embodiments, the solution to the virtual machine placement problem can be continually changed as resource constraints change over time.

The term "optimal solution" can include a globally optimal solution (the best solution among all possible solutions) or a locally optimal solution (the best solution among a subset of all possible solutions). Also, the term "optimal solution" can refer to either an exact optimal solution or an approximate optimal solution.

As depicted in FIG. 1, each placement controller 136 includes one or more CPUs 138 and memory 140. Also, a network interface 142 is provided in the placement controller 136 to allow communication between the placement controller 136 and the network 104.

The placement controller 136 also includes a VM layout selector 144 (to perform selection of a layout of the virtual machines mapped to physical machines), in accordance with some embodiments. Additionally, the placement controller 136 includes a migration control module 146 to control migration of virtual machines from one physical machine to another physical machine (in accordance with the layout selected by the VM layout selector 144). Also, the placement controller 136 can include a cooling/power policy module 145 for determining whether certain physical machines and/or cooling equipment can be powered down (or placed into lower power state) based on a current virtual machine layout. In some implementations, the VM layout selector 144, cooling/power policy module 145, and migration control module 146 are software modules executable on the CPU 138 of the placement controller 136.

As noted above, in determining placement of virtual machines onto corresponding physical machines, the placement controller 136 (more specifically the VM layout selector 144) takes into account various predefined criteria. One type of predefined criteria is related to loading of physical resources (including hardware 122) or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources. Each of the resources is associated with a respective dimension. If there are n resources to be considered for the problem of optimal placement of virtual machines on physical machines, then these n resources correspond to n dimensions.

The loading criteria in n dimensions are factored into the decision regarding optimal placement of virtual machines. Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

As noted above, placement of virtual machines should satisfy a QoS goal of the system. This QoS may have been set by a user or by the system. One example QoS goal is the allocation of scheduling shares to each virtual machine within a physical machine. The VMM 132 according to some implementations includes a scheduler that schedules access to physical resources of the physical machine 100, where the scheduler in the VMM 132 specifies the number of shares to allocate to each virtual machine. For example, 2,000 shares may be allocated to virtual machine 106, 1,000 shares may be allocated to virtual machine 108, and 500 shares may be allocated to virtual machine 110. In this example scenario, virtual machine 106 has half the number of shares of the physical machine 100. The half share of the physical resources of the physical machine can be considered a QoS goal of the virtual machine 106. Thus, if the placement controller 136 decides to migrate virtual machine 106 from physical machine 100 to another physical machine, such as physical machine 102, the placement controller 136 checks to ensure that after migration the QoS for virtual machine 106 can be kept at the same ratio.

The above is provided as an example of a QoS goal. Other examples can include a separate QoS for each of the n dimensions corresponding to the n resources.

Other example criteria that are considered by the VM layout selector 144 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 144. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that is considered by the VM layout selector 144 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 144 determines that the benefit of migrating a virtual machine is less than the cost of performing the migration, then the migration should not be performed.

As noted above, the placement problem for identifying an optimal solution for placement of virtual machines on physical machines is a relatively complex problem. For a large system having many physical machines and virtual machines, the computation time for identifying the optimal placement of virtual machines can be very large. In accordance with an embodiment, a simulated annealing technique is used to find an approximation of a globally optimal placement of virtual machines on physical machines. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 144 is based on a cost function (alternatively referred to as a "goodness function") that takes into account various constraints that represent the predefined criteria described above. The cost function is represented by some aggregation of terms, where each term is multiplied by a weight factor. Generally, the cost function has the form: $f=w_1 \times t_1 + w_2 \times t_2 + \ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, and so forth. The weight to be multiplied to each term generally represents the importance of the corresponding term in computing the goodness rating for a particular layout of virtual machines.

The weights in some cases can be set (or otherwise influenced) by a user. For example, the controller 136 can present a graphical user interface (GUI) screen that provides various fields in which the user can input values corresponding to weights to be applied to various terms. In an alternative implementation, the weights can be input to the controller 136 by some other technique, such as in a file. Other weights can be hardcoded into the VM layout selector 144.

Each of the terms in the cost function is based on parameters measured or estimated by the VM layout selector 144. For a given layout of virtual machines, parameters corresponding to the various criteria being considered are measured or estimated. For example, parameters relating to resource utilization, cooling costs, power consumption, balancing, and so forth, for a given layout of virtual machines can be measured or estimated. Note that the parameters corresponding to the current layout (the layout that is currently being used) can be measured by the VM layout selector 144.

However, when considering alternative layouts (which are trial layouts not yet implemented) to compare to the current layout, the parameters for the alternative layouts may have to be estimated (using an internal model provided with the VM layout selector 144), where the model can be generated based on historical information. The measured or estimated parameters are then translated to the terms of the cost function. Thus, for each given layout of virtual machines, the cost function outputs a goodness rating indicator.

Figure 2:
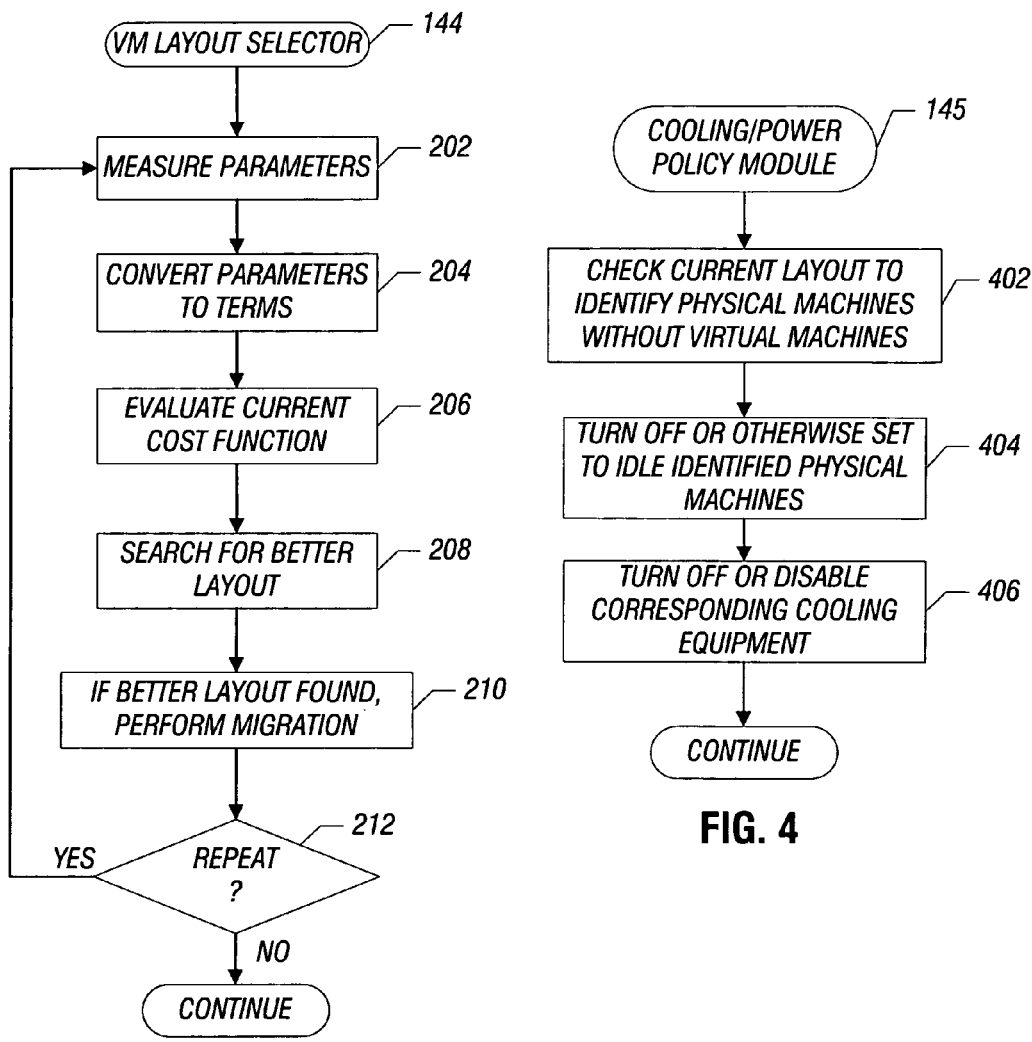
FIG. 2 is a flow diagram of a virtual machine layout selection process performed by the controller(s) of FIG. 1, in accordance with an embodiment.

A flow diagram of a process performed by the VM layout selector 144 is depicted in FIG. 2. The flow of FIG. 2 is performed repeatedly, such as at regular intervals or in response to predefined events. The VM layout selector 144 of the controller 136 measures (at 202) various parameters relating to the terms to be considered for the cost function discussed above. The measured parameters are converted (at 204) into the terms for use in the cost function.

The VM layout selector 144 then evaluates (at 206) the cost function based on the terms derived from the measured parameters. The cost function produces an output that provides some indication of the performance of the particular placement of virtual machines on physical machines (such as in the form of a goodness rating or some other indicator). Next, the VM layout selector 144 searches (at 208) for a better layout that represents another placement of virtual machines on physical machines.

If a better virtual machine layout is found in the search (at 208) for the better layout, the VM layout selector 144 causes the migration module 146 to perform (at 210) migration of one or more virtual machines according to the better virtual machine layout. Migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually (e.g., lazily) to the destination physical machine to which the virtual machine is migrated.

The VM layout selector 144 determines (at 212) if the process at 204-210 is to be repeated. Repetition of the process at 204-210 can be performed periodically or in response to predefined events (e.g., detection of overheating, alarm indicating some fault has occurred, and indication of overloading, etc.).

Figure 3:
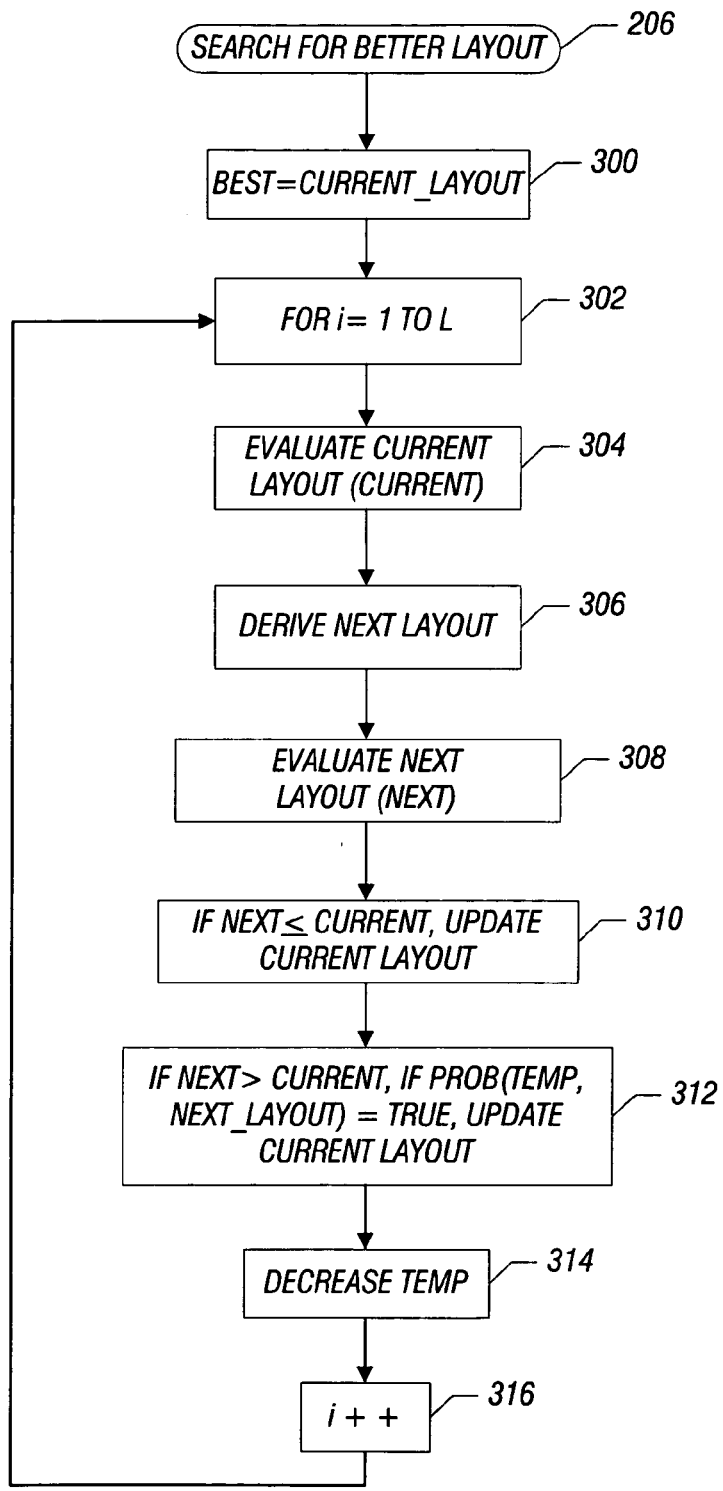
FIG. 3 is a flow diagram of a process to find a better layout of virtual machines, in accordance with an embodiment.

The process of searching for a better layout (208) according to one implementation is depicted in greater detail in FIG. 3. Note that different algorithms can be used in other implementations. Searching for a better layout is performed iteratively in a loop (For loop 302 where a variable i is incremented from 1 to L). Note that the value of L (which represents the number of iterations to be performed in searching for a better layout) is dependent upon various factors, including desired quality of the solution identified in the search and computation time constraints. The value of L may potentially be influenced by a user or by the controller 136. A larger number of iterations (larger L) would lead to a better solution; however, the larger number of iterations comes at the expense of longer computation time. Another factor to be considered in setting the value of L is the expected frequency with which the procedure of FIG. 2 is performed. The computation time involved in performing the process of FIG. 3 should not exceed the expected time interval between iterations of the FIG. 2 procedure; otherwise, the result produced by the FIG. 3 procedure in finding a better layout would not be produced in time for use in the procedure of FIG. 2.

In FIG. 3, before starting the loop 302, a variable Best is set (at 300) equal to the current layout (represented by Current_Layout). Next, after entering the loop 302, the current layout is evaluated (at 304) by setting a variable Current equal to Eval(Current_Layout). Eval( ) is a subroutine invoked by the VM layout selector 144 to evaluate the cost function, in this case the cost function containing terms relating to the current layout.

A next layout (represented by Next_Layout) is then derived (at 306) by setting Next_Layout equal to Tweak(Current_Layout), where Tweak( ) is a subroutine invocable by the VM layout selector 144 for modeling the change in the placement of virtual machines. In other words, the layout produced by Tweak( ) is a trial layout used for purposes of comparison to the current layout; no actual migration of virtual machines occurs yet. According to one example implementation of the simulated annealing technique, the next layout selected is based on generating random numbers, where the random numbers can indicate which virtual machine(s) and which physical machine(s) are to be the subject of a migration, which migration causes the next layout to be different from the current layout. In one embodiment, according to the simulated annealing technique, the tweak can be a minor tweak, in which just one or two virtual machines are moved to different physical machines. In yet another implementation, over L iterations, two moves of virtual machines can be made in iterations 1 to L/2, whereas just one move of a virtual machine is performed in iterations L/2+1 to L. In other implementations, other types of tweaks can be performed.

After the next layout has been derived, the VM layout selector 144 evaluates (at 308) the next layout (the tweaked layout) by calling Eval(Next_Layout). The result of the evaluation (the goodness rating) is stored in a variable Next. Assuming that a lower goodness rating specifies a better layout, if Next≤Current (in other words, the tweaked layout is better than the current layout according to the goodness rating), then the current layout is updated (at 310). In updating the current layout, Current_Layout is set equal to Next_Layout, and the variable Best is set equal to Next_Layout. Note that in other implementations, other types of goodness ratings can be used, where a higher goodness rating would indicate a better layout.

If the tweaked layout is determined to be worse than the current layout based on the goodness rating (Next>Current), then the current layout (Current_Layout) can still be updated (at 312) with the tweaked layout (Next_Layout) based on the output of a probability function, Prob(Temp, Next_Layout). Effectively, if the probability function evaluates to a true result, the current layout is set equal to the tweaked layout even though the tweaked layout has a worse goodness rating (Next) than the goodness rating (Current) of the current layout. This update of the current layout with a worse tweaked layout is performed to reduce the likelihood that the algorithm of searching for a better layout will be trapped in a local minimum.

The probability function Prob( ) compares a random number against a value that is based on goodness ratings Next and Current and a temperature value (Temp). In one embodiment, comparison performed by the Prob( ) function is expressed as follows:

$$Rg(\ ) < e^{(Current-Next)/Temp}, \qquad (Eq.\ 1)$$

where Rg( ) is a function to produce a random number between 0 and 1. Since Next is larger than Current when the step at 312 is performed, the exponential function e is of a negative value, since (Current−Next) is negative. Therefore, the exponential function e will produce a value less than 1.

The Temp value in Eq. 1 is a value that decreases as a function (linear or non-linear function) of the number of iterations in FIG. 3. As Temp decreases, the exponential function will likely be of a larger negative number with each iteration, such that the exponential function will likely produce a smaller value. A smaller value produced by the exponential function means that the comparison of Eq. 1 will more likely to produce a false result. Because Temp is in the denominator, in the case where Temp is equal to zero, the function Prob( ) handles this special case by outputting a false result.

As indicated by FIG. 3, if the probability function Prob( ) produces a true result, then the current layout is updated (at 312) by setting Current_Layout=Next_Layout, and by also setting Best equal to Next_Layout. However, if the probability function Prob( ) produces a false result, the current layout remains unchanged.

Next, the value of Temp is decreased (at 316). As noted above, decreasing Temp increases the likelihood that the comparison of Eq. 1 produces a false result. The effect of reducing Temp with each iteration of the procedure in FIG. 3 is that in the later rounds of the FIG. 3 procedure, the lower value of Temp will cause it more unlikely for the current layout to be set equal to a tweaked layout that has a worse goodness rating than the current layout.

The value of the variable i is then incremented (at 318), and the loop 302 is re-iterated until L iterations have been performed.

In a different embodiment, instead of using the simulated annealing algorithm discussed above, a genetic algorithm can be used for selecting a better layout regarding placement of virtual machines on physical machines. In the genetic algorithm approach, candidates corresponding to different virtual machine layouts are provided. These candidates are the potential solutions to the problem of finding the better virtual machine layout. The candidates are represented by genetic representations (in the form of genetic individuals that are made up of a set of genes). Thus, each genetic individual represents a possible virtual machine placement solution. Each of the candidates represented by the genetic individuals is evaluated by the genetic algorithm to determine some goodness rating (which can be computed using a function for producing a measure indicating performance) for the corresponding candidate.

Some subset of the genetic individuals can then be selected (such as the subset of parents with the best goodness ratings) as parents for performing cross-over operation. In a cross-over operation, one genetic individual is combined with another genetic individual (by a cross-over function) to produce a child genetic individual. Each child genetic individual represents a different potential solution of a virtual machine layout. The goodness ratings for the children genetic individuals are then determined, with these children genetic individuals selected for further cross-over operation. The genetic algorithm proceeds over several different generations until some better solution is identified. The number of generations to be traversed can be preset. A benefit of genetic algorithms is that they are less likely to be trapped in local minima.

In yet another embodiment, other types of Stochastic algorithms can be used to approximate an optimal solution to the virtual machine placement problem by using a random search of some portion of the solution space. The simulated annealing technique and genetic algorithm technique discussed above are examples of Stochastic algorithms.

As discussed above, if the other criteria permit, the VM layout selector 144 attempts to consolidate virtual machines onto a smaller number of physical machines to reduce cooling costs and power consumption/costs. Based on this consolidation, the cooling/power policy module 145 can be invoked to determine whether or not certain physical machines can be turned off or otherwise placed into an idle state. A process performed by the cooling/power policy module 145 is depicted in FIG. 4.

The cooling/power policy module 145 checks (at 402) the current layout, as output by the VM layout selector 144, to identify physical machine(s) without virtual machines. In response to identifying any such physical machines, the cooling/power policy module 145 issues commands to turn off or otherwise set idle (at 404) the identified physical machines. Also, the cooling/power policy module 145 can issue commands to turn off or otherwise disable (at 406) cooling equipment corresponding to the shut off or idle physical machines. Turning off, setting idle, disabling physical, or placing into lower power states machines or cooling equipment is generically referred to as "powering down" the physical machines or cooling equipment.

The cooling/power policy module 145 is also responsible for issuing commands to turn on physical machines and/or cooling equipment in response to the virtual machine layout changing that causes a virtual machine to migrate to a physical machine that was previously off or idle.

Instructions of software described above (including the VM layout selector 144, migration control module 146, and cooling/power policy module 145 of FIG. 1) are loaded for execution on a processor (such as one or more CPUs 138 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., memory 140), which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A controller to provide an arrangement of virtual machines on physical machines, comprising:
    at least one central processing unit (CPU);
    a layout selector executable on the at least one CPU, the layout selector to:
        in response to an event, compare a current layout of virtual machines deployed on physical machines against a new layout of virtual machines on physical machines, wherein comparing the current layout against the new layout comprises comparing respective indicators of the current and new layouts, wherein the indicators provide information regarding corresponding performances of the current and new layouts, and wherein each of the indicators is computed based on parameters associated with a corresponding one of the current and new layouts;

in response to determining that the new layout is better than the current layout based on comparing of the indicators, selecting the new layout; and a migration module executable on the at least one CPU to migrate at least one virtual machine between physical machines according to the selected new layout.

2. The controller of claim 1, wherein the layout selector is executable to further compute the indicators comprising goodness ratings based on a cost function for the corresponding current layout and new layout, wherein the layout selector is executable to compare the current layout with the new layout based on the goodness ratings.

3. The controller of claim 1, wherein the layout selector is executable to further:

in response to determining that the new layout is worse than the current layout, select the new layout in response to a result returned by a probability function.

4. The controller of claim 3, wherein the probability function compares a random number against a value that is based on the indicators of the current layout and new layout, the probability function producing the result based on the comparing.

5. The controller of claim 3, wherein the result returned by the probability function is dependent on a value that varies with a number of iterations performed by the layout selector.

6. The controller of claim 1, wherein the layout selector is executable to derive the new layout using one of a simulated annealing technique and a genetic algorithm technique.

7. At least one machine-readable storage medium storing instructions that when executed cause a system having a processor to:

compute indicators associated with plural different layouts of virtual machines on physical machines, wherein the indicators provide information regarding performances of corresponding layouts, and wherein each of the indicators is computed based on parameters associated with a corresponding one of the plural layouts;

compare the indicators;

based on the comparing, determine whether at least one virtual machine in a first of the physical machines should be migrated to a second of the physical machines; and cause migration of the at least one virtual machine from the first physical machine to the second physical machine in response to determining that the at least one virtual machine should be migrated.

8. The at least one machine-readable storage medium of claim 7, wherein computing the indicators comprises comparing the indicators based on the parameters representing respective plural criteria, wherein the criteria include multiple criteria selected from among: (1) loading criterion relating to loading of corresponding resources of the physical machines; (2) overloading criterion relating to loading of the physical machines; (3) balancing criterion relating to balancing of workload across physical machines; (4) migration cost criterion relating to cost of migrating a virtual machine between physical machines; (5) cooling cost criterion relating to cost of cooling equipment; and (6) power cost criterion relating to power consumption cost.

9. A method comprising:

computing indicators associated with plural different layouts of virtual machines on physical machines, wherein the indicators provide information regarding performances of corresponding layouts, wherein each of the indicators is computed based on parameters associated with a corresponding one of the plural layouts, and wherein the parameters include parameters relating to cooling and power consumption of the physical machines;

comparing the indicators;

selecting, based on the comparing, a target layout of the virtual machines in the physical machines, wherein the target layout is selected from among the plural layouts based on the comparing; and according to the selected target layout, migrating at least one of the virtual machines from one of the physical machines to another of the physical machines.

\* \* \* \* \*